(12) United States Patent
Yoon et al.

(10) Patent No.: US 10,963,009 B2
(45) Date of Patent: Mar. 30, 2021

(54) HEAD-MOUNTED DISPLAY

(71) Applicant: LG ELECTRONICS INC., Seoul (KR)

(72) Inventors: Sumin Yoon, Seoul (KR); Bupsung Jung, Seoul (KR); Donghyok Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/342,960

(22) PCT Filed: Dec. 5, 2016

(86) PCT No.: PCT/KR2016/014175
§ 371 (c)(1),
(2) Date: Apr. 17, 2019

(87) PCT Pub. No.: WO2018/074657
PCT Pub. Date: Apr. 26, 2018

(65) Prior Publication Data
US 2020/0050235 A1 Feb. 13, 2020

Related U.S. Application Data

(60) Provisional application No. 62/409,388, filed on Oct. 18, 2016.

(51) Int. Cl.
*G06F 1/16* (2006.01)

(52) U.S. Cl.
CPC .................... *G06F 1/163* (2013.01)

(58) Field of Classification Search
CPC ........ G02B 27/0176; G02B 2027/0154; G02B 27/017; G06F 1/163; G06F 3/011;
(Continued)

(56) References Cited

U.S. PATENT DOCUMENTS 9,557,569 B2 * 1/2017 Tazbaz ............... G02B 27/0176
9,703,103 B2 * 7/2017 Araki ........................ G09G 5/00
(Continued)

FOREIGN PATENT DOCUMENTS

| CN | 104662466 | 5/2015 |
| KR | 20140025121 | 3/2014 |

(Continued)

OTHER PUBLICATIONS

PCT International Application No. PCT/KR2016/014175, International Search Report dated May 23, 2017, 2 pages.
(Continued)

*Primary Examiner* — Adam J Waggenspack
(74) *Attorney, Agent, or Firm* — Lee, Hong, Degerman, Kang & Waimey

(57) ABSTRACT

The present invention provides a head-mounted display comprising: a body part including a display part for displaying an image; a fixing part, which surrounds a head part to allow the body part to be fixed to the head part and includes a front support part, a rear support part having an adjustable length, and a connecting part; a connecting frame that connects the body part to the fixing part to allow the body part to rotate and move with reference to the fixing part; and a band part, which has opposite ends fixed to the fixing part and is formed to elastically surround the head part, together with the front support part.

10 Claims, 11 Drawing Sheets

(58) Field of Classification Search
CPC .. F16M 13/04; A42B 1/24; A42B 1/22; A42B 3/042; A42B 3/085
USPC .......................................... 224/181
See application file for complete search history.

(56) References Cited

U.S. PATENT DOCUMENTS

| | | | |
|---|---|---|---|
| 2004/0070825 A1* | 4/2004 | Charlesworth .... | G02B 27/0172 359/462 |
| 2010/0007581 A1* | 1/2010 | Kato .................. | G02B 27/0176 345/8 |
| 2010/0327028 A1 | 12/2010 | Nakabayashi et al. | |
| 2014/0364212 A1 | 12/2014 | Osman et al. | |
| 2016/0054571 A1* | 2/2016 | Tazbaz ............... | G02B 27/0176 359/630 |

FOREIGN PATENT DOCUMENTS

| | | |
|---|---|---|
| KR | 20150060698 | 6/2015 |
| KR | 20160026429 | 3/2016 |
| WO | 2015137165 | 9/2015 |
| WO | 2015168191 | 11/2015 |
| WO | 2016028578 | 2/2016 |

OTHER PUBLICATIONS

European Patent Office Application Serial No. 16919110.3, Search Report dated May 29, 2020, 8 pages.
The State Intellectual Property Office of the People's Republic of China Application Serial No. 20168090170.0, Office Action dated Oct. 16, 2020, 13 pages.

* cited by examiner

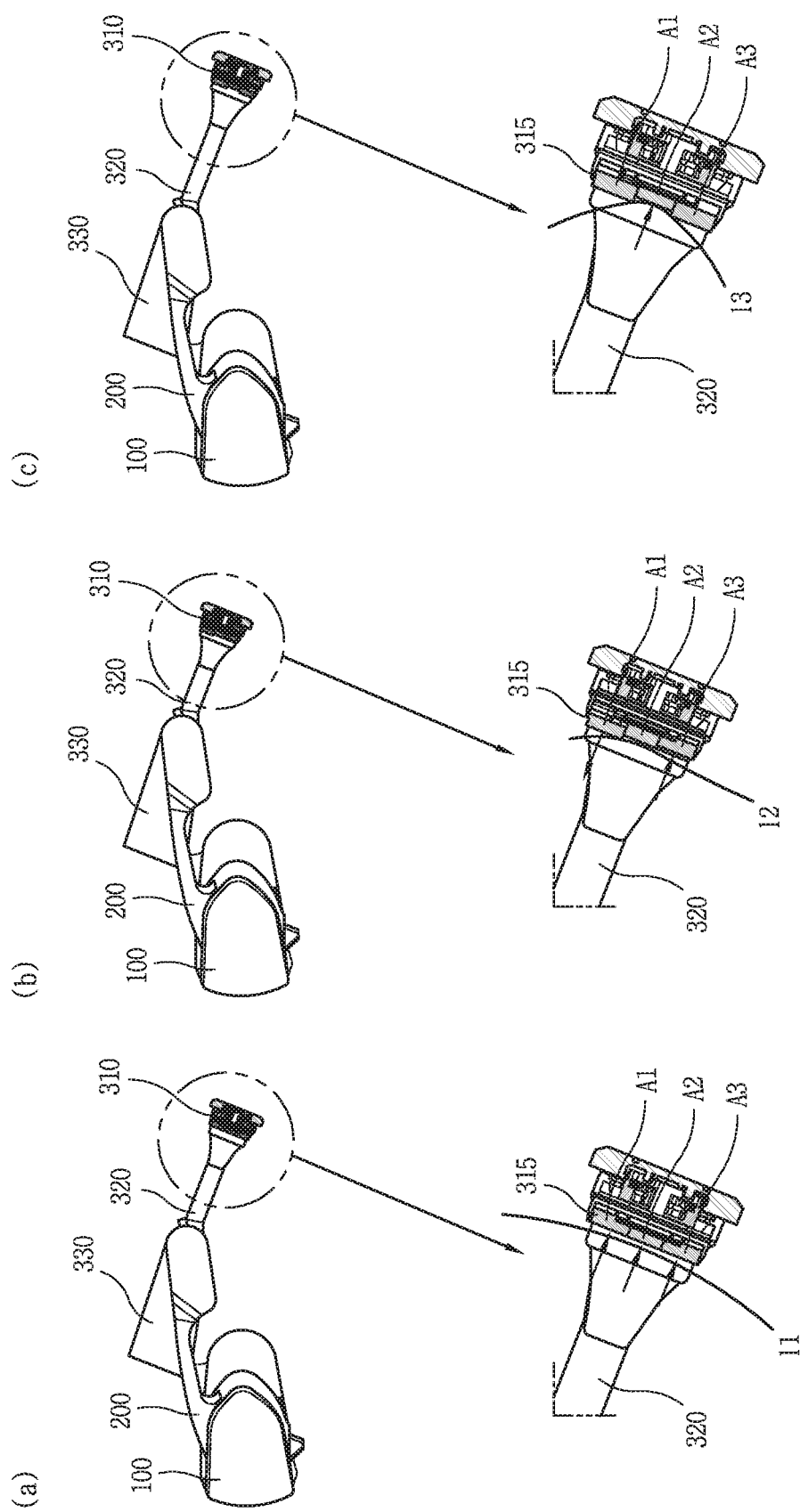

HEAD-MOUNTED DISPLAY

CROSS-REFERENCE TO RELATED APPLICATIONS

This application is the National Stage filing under 35 U.S.C. 371 of International Application No. PCT/KR2016/014175, filed on Dec. 5, 2016, which claims the benefit of U.S. Provisional Application No. 62/409,388, filed on Oct. 18, 2016, the contents of which are all hereby incorporated by reference herein in their entirety.

TECHNICAL FIELD

The present invention relates to a head-mounted display capable of moving and rotating a display module (a display part or a display unit) with it on the head of a human body.

BACKGROUND ART

Terminals may be divided into a glass-type terminal (mobile/portable terminals) and a stationary terminal according to mobility. Also, the glass-type terminal may be classified into a handheld type and a vehicle mount type according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

A wearable glass type terminal which is wearable on a part of a human body is recently developed. A glass type terminal worn on a user's head may correspond to a head mounted display (HMD). A display unit provided in a glass type terminal such as an HMD may provide various conveniences to a user by combining with an augmented reality technology, an N-screen technology and the like beyond a simple image output function.

In the case of a head-mounted display worn on a user's head, a device for pressing the user's head is required for ensuring wearing stability. However, it is inconvenient for the user since the device stably fixed on the user's head needs to be removed when wearing and taking off the head-mounted display.

In addition, as a head-mounted display is commercialized, a user's need for a more convenient structure for wearing and receiving an image is increasing.

DETAILED DESCRIPTION OF THE DISCLOSURE

The present invention is directed to providing a head-mounted display (HMD) capable of being easily worn on or removed from a user's head by way of allowing a display unit (or display part) to be movable and rotatable.

In order to achieve the aspect of the present invention, there is provided a head-mounted display (HMD), including a body part including a display part for displaying an image, a fixing part which surrounds a head part to allow the body part to be fixed to the head part and includes a front support part, a rear support part, and a connecting part, a connecting frame that connects the body part to the fixing part to allow the body part to rotate and move with reference to the fixing part, and a band part, which has opposite ends fixed to the fixing part and is formed to surround the head part, together with the front support part.

According to one aspect of the present invention, the rear support part may include a cover portion, an elastic support portion placed on the cover portion and having first to third support members which are independently moved by an external force, and a spring portion including first to third springs that are disposed to correspond to the first to third support members and are elastically deformed in an individual manner. Accordingly, different support members and springs are moved and deformed according to a shape of a user's head, thereby relieving pain caused by pressure when wearing the head-mounted display.

According to one aspect of the present invention, the connecting part may further include a rail portion which is connected to a first connection member of the connecting frame so that the connecting frame is movable in one direction and extends in the one direction. Accordingly, the user can move the body part away from or close to both eyes with wearing the head-mounted display.

According to one aspect of the present invention, the connecting frame may further include a second connection member which is connected to the first connection member and coupled to the connecting part so as to be rotatable with respect to a direction perpendicular to the rail portion. Accordingly, the user can rotate the body part with wearing the head-mounted display, which allows the user to move the body part from a visual field without completely taking the head-mounted display off when pausing a currently-watching image.

EFFFECTS OF THE DISCLOSURE

According to an embodiment of the present invention, a head-mounted display can be worn more stably in a manner of being primarily fixed to a head portion by a band part and a front support part, and then fixed to the head portion properly by a tightening module of a rear support part.

Also, when the rear support part is pressed against the head portion by the tightening module, the head-mounted display can be supported in a deformed state suitable for a shape of the head portion by a plurality of support members and springs individually moved and deformed, thereby minimizing pain on the head portion.

In addition, since a connecting frame and a connecting part are coupled to each other to be movable and rotatable relative to each other, a user, with the head-mounted display on, can move the body part from both eyes to watch an image at a desired distance or move the body part out of a visual field so as to stop watching the image without taking the head-mounted display off.

BRIEF DESCRIPTION OF THE DRAWINGS

FIG. 4B is a conceptual view for explaining support members moving individually according to a shape of a head.

EFFECTS OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
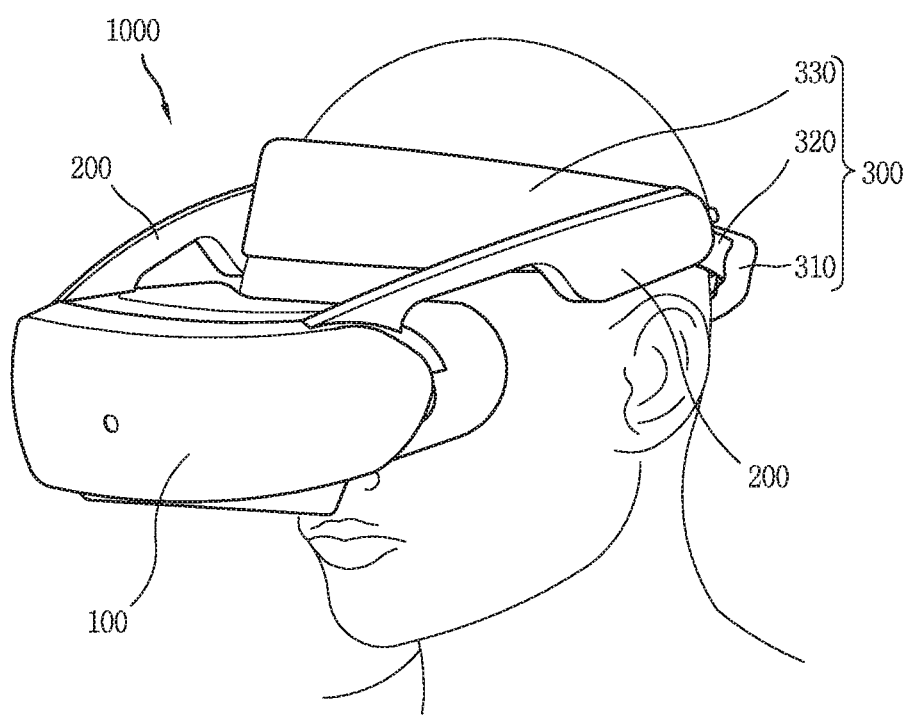
FIG. 1A is a conceptual view illustrating a state in which a head-mounted display is worn on a head of a user according to one embodiment of the present invention.
Figure 1B:
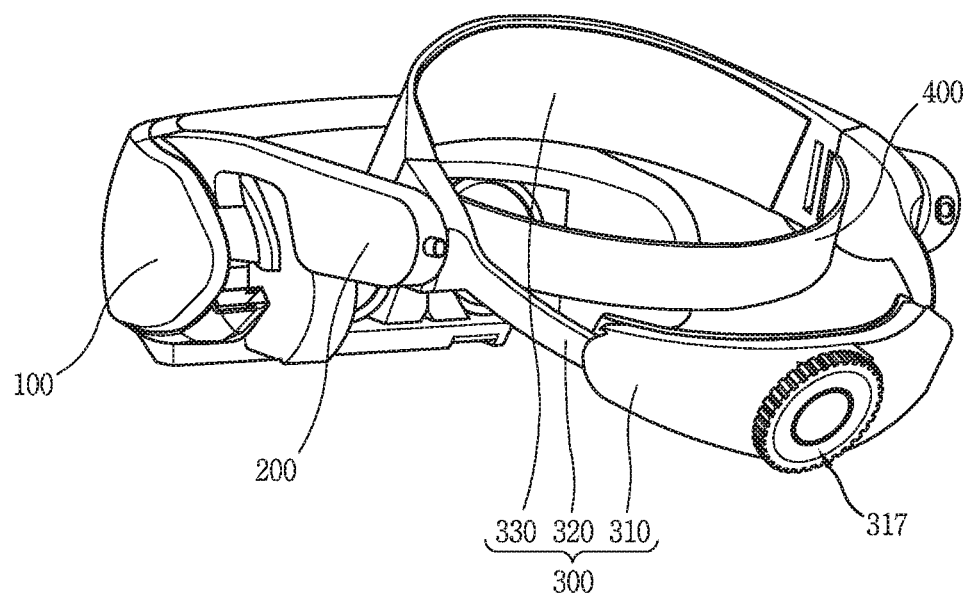
FIG. 1B is a conceptual view of a head-mounted display viewed from one direction.

FIG. 1A is a conceptual view illustrating a state in which a head-mounted display (HMD) 1000 is worn on the head of a user according to one embodiment of the present invention, and FIG. 1B is a conceptual view of the HMD 1000 viewed from one direction.

Referring to FIGS. 1A and 1B, a head-mounted display (HMD) 1000 includes a body part (or main body) 100 provided with a display module (or a display part) for displaying an image, a connecting frame 200 connected to the body part 100, a fixing part (or fixing unit) 300 connected to the connecting frame 200 and fixed to a head of a user, and a band part 400 that elastically supports a rear side of the head.

When a head portion where the user's eyes are located is defined as a front side and an opposite direction is defined as a rear side, the band part 400 elastically supports the rear side of the head portion. The fixing unit 300 includes a rear support part 310, a connecting part 320 and a front support part 330. The front support part 330 is fixed to the front side of the head portion. The rear support part 310 of the fixing unit 300 supports the rear side of the head part while overlapped with the band part 400.

The body part 100 is disposed at the front side of the head portion by the fixing unit 300 and the band part 400. The body part 100 is fixed to the connecting frame 200, and the connecting frame 200 is configured to move to the front and rear sides of the head portion based on the fixing unit 300, or to be rotated within a specific angle range. The user can fix the band part 400 and the fixing unit 300 to the head portion, and move and rotate the connecting frame 200 so that the display module is properly positioned in front of both eyes. Accordingly, the HMD 1000 can be stably worn fitting to a head size by primarily fixing it to the head portion using the band unit 400 and secondarily tightening the fixing unit according to the head size.

Meanwhile, since the head is fixed between the band part 400 and the front support part 330 of the fixing unit 300, the HMD 1000 can be worn on the head portion by elasticity of the band part 400 even without tightening the rear support part 310 of the fixing unit 300. The rear support part 310 is closely in contact with the head portion by a tightening module 317 of the rear support part 310 of the fixing unit 300 while being fixed by the band part 400 and the front support part 330. The connecting part 320 is inserted into and pulled out of the rear support part 310 by the tightening module 317.

Since a fixing unit for fixing the HMD to the head portion is mounted on the front and rear sides of the head portion, and the body part including the display module has the separate frame from the fixing unit, weight is dispersed, thereby being stably mounted on the head portion.

A configuration of the tightening module 317 will be described in detail with reference to FIG. 2.

FIG. 10 is a conceptual view for explaining a state of the present invention in which the body part is moved and rotated while being fixed to the head portion.

Referring to FIGS. 1B and 10, the body part 100 is disposed in a manner that the display module is located at the front of both eyes of the user so as to display an image. The band part 400 and the fixing unit 300 and the body part 100 are arranged to face different directions.

When the user applies an external force to the body part 100 in one direction, the body part 100 and the connecting frame 200 move away from the fixing unit 300. That is, a space is formed between the user's face and the body part 100 while the body part 100 mounted to be closely in contact with the face moves. In this case, the user can wear glasses using this space. In addition, when an external force is applied again to the body part 100 in an opposite direction, the body part 100 may be disposed to be closely in contact with the user's face.

Meanwhile, the body part 100 may be rotated with respect to an area where the connecting frame 200 and the fixing part 300 are connected by applying an external force to the body part 100. When the body part 100 and the connecting frame 200 are rotated with respect to one end portion of the connecting frame 200, the body part 100 is away from both eyes of the user. The body part 100 may be maintained in a state of being arranged in a row with the fixing unit 300.

Accordingly, when the user stops the HMD temporarily, the user can move the body part 100 away from the both eyes and does not have to remove the whole HMD 1000 from the head portion.

In addition, since the HMD can be fixed to the head portion using the fixing unit 300 and the band part 400 regardless of a position where the display module is disposed on the body part, the HMD can be primarily fixed to the head portion in a state where a visual field is not blocked by the body part.

Figure 2:
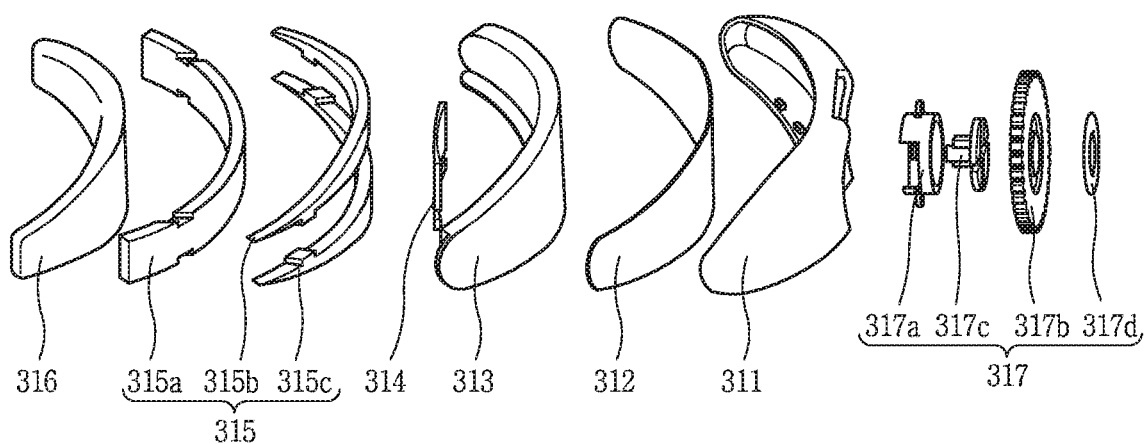
FIG. 2 is an exploded view illustrating components of a rear support part of a fixing part (fixing unit).
Figure 3A:
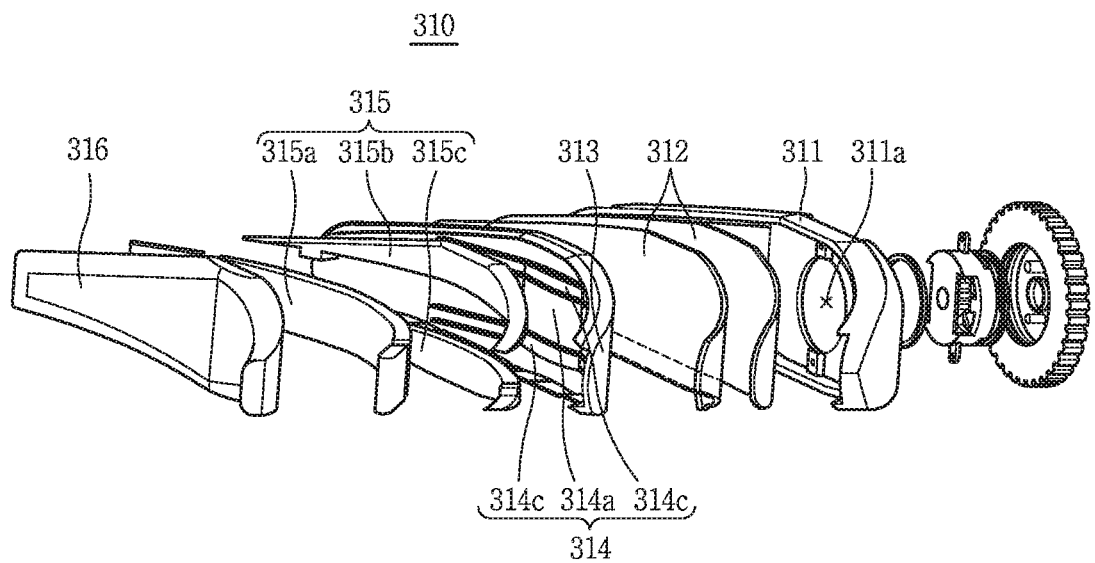
FIG. 3A is a conceptual view illustrating disassembled components of a rear support part viewed from one direction.

FIG. 2 is an exploded view illustrating components of a rear support part of a fixing unit. FIG. 3A is a conceptual view illustrating disassembled components of the rear support part viewed from one direction.

The rear support part 310 includes a cover portion 311, an inner cover 312, a guide portion 313, a spring portion 314, an elastic support portion 315, a cushion portion 316, and a tightening module 317. The cover portion 311, the inner cover 312, the guide portion 313, the elastic supporting portion 315 and the cushion portion 316 are formed in a concave shape so as to be placed on the head portion.

The inner cover 312, the guide portion 313, the spring portion 314, the elastic support portion 315 and the cushion portion 316 are sequentially mounted on the cover portion 311. The cover portion 311 forms a curved surface to support a round head.

The cover portion 311 includes a mounting hole 311a to mount the tightening module 317 thereon. The tightening module 317 is provided with a gear holder 317a. A gear portion 317c mounted on a dial portion 317b exposed to outside of the cover portion 311 is mounted on the gear holder 317a. A decorative portion 317d may be provided on an outer surface of the dial portion 317b. The decorative portion 317d is made of a metal material.

Although not shown in the drawings, a connection member is connected to both ends of the gear portion 317c and the connecting part 320. Accordingly, the gear portion 317c is rotated by rotation of the dial portion 317b, and the connecting part 320 connected by the connection member is pulled. Since one portion of the connecting part 320 is inserted into the rear support part 310, an inner space of the fixing unit 300 to which the head portion is fixed is narrowed. On the other hand, the inner space of the fixing unit 300 is widened as tension applied to the connection member by an external force, which is applied to the dial portion 317b, is released.

The inner cover 312 is mounted on the cover portion 311 to cover the mounting hole 311a. The guide portion 313 is disposed on the inner cover 312.

Figure 3B:
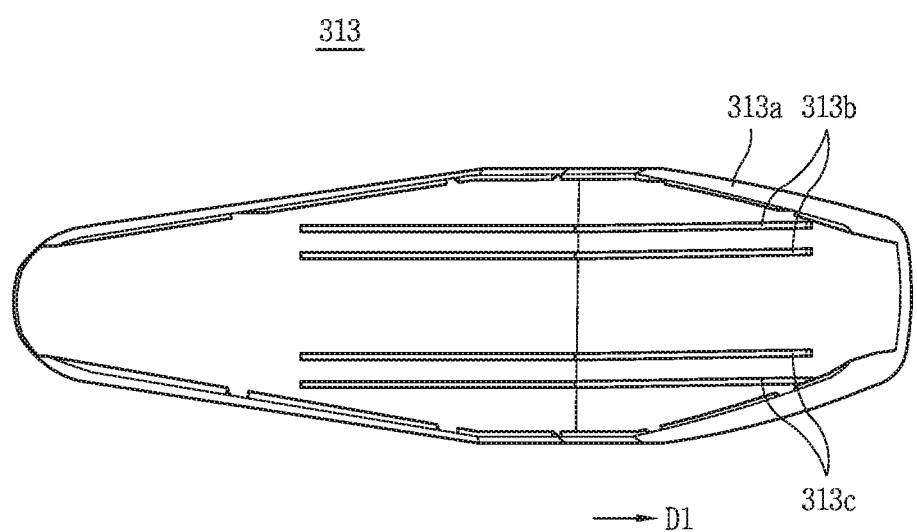
FIG. 3B is a conceptual view illustrating a guide portion.

FIG. 3B is a conceptual view illustrating a guide portion.

The guide portion 313 includes a pair of first guide protrusions 313b and a pair of second guide protrusions 313c formed on one surface thereof for guiding the spring portion 314 so as to be deformed by an external force. An inner space 313a is formed in the guide portion 313 so that the spring portion 314 is disposed on the one surface.

The first and second guide protrusions 313b and 313c extend along a first direction D1. The spring portion 314 includes first to third spring members 314a, 314b, and 314c. The second spring member 314b is disposed between the pair of first guide protrusions 313b, and the third spring member 314c is disposed between the pair of second guide protrusions 313c. The first spring member 314a is placed between the first and second guide protrusions 313b and 313c. The first to third spring members 314a, 314b and 314c are formed in a curved shape so as to form a spacing from the guide portion 313 while being mounted between the first and second guide protrusions 313b and 313c. When an external force is applied, the first to third spring members 314a, 314b and 314c gradually become flat such that both ends of the spring members can move along the first and second guide protrusions 313b and 313c.

In this embodiment of the present invention, the rear support part 310 includes three spring members arranged in three regions defined by the first and second guide protrusions 313b and 313b, but the number of the spring members is not limited thereto.

The elastic support portion 315 includes first to third support members 315a, 315b and 315c disposed on the first to third spring members 314a, 314b and 314c. The second and third support members 315b and 315c are disposed with the first support member 315a interposed therebetween. The first, second, and third support members 315a, 315b, and 315c include coupling grooves and coupling protrusions formed on surfaces facing each other in a corresponding manner.

Specifically, coupling grooves are formed on one side surface of the first support member 315a, and coupling protrusions are formed on one side surface of the second and third support members 315b and 315c to be inserted into the coupling grooves, respectively. The first to third support members 315a, 315b, and 315c may move relative to each other while the coupling grooves and the coupling protrusions are at least partially coupled to each other.

The first, second, and third support members 315a, 315b, 315c are individually moved by an external force to deform the first to third springs 314a, 314b, 314c. However, as the first to third support members 315a, 315b, and 315c are movably coupled by the coupling grooves and the coupling protrusions, they move in a thickness direction of the rear support part 310 without being dislocated (misaligned) from each other. Accordingly, they can be stably moved in the inner space of the cover portion 311.

The cushion portion 316 is disposed on the elastic support portion 315. The cushion portion 316 is made of a soft material so as to be deformed by an external force for supporting the head portion.

When the head of the user presses the cushion portion 316 by the tightening module 315, one region of the cushion portion 316 is pressed according to a shape of the head, and at least one of the first to third support members 315a, 315b, and 315c corresponding to the pressed region is moved. Then, at least one of the first to third springs 3314a, 314b, and 314c, corresponding to the at least the one of the first to third support members 315a, 315b, and 315c, is deformed by the movement.

FIG. 4 is a conceptual view illustrating an elastic support portion according to another embodiment of the present invention.

Figure 4A:
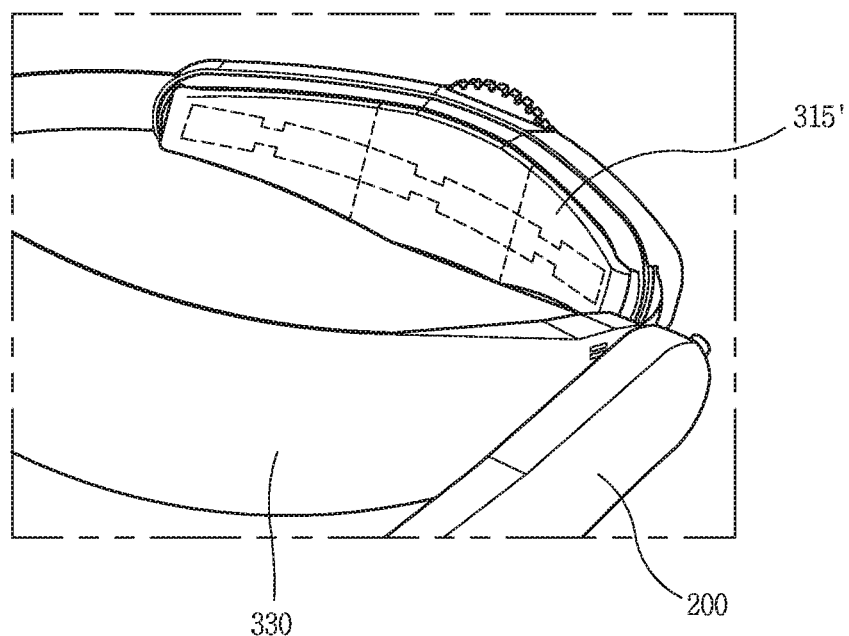
FIG. 4A is a conceptual view illustrating an elastic support portion in accordance with another embodiment of the present invention.

An elastic support portion 315' in accordance with FIG. 4A includes nine support members. The nine support members are coupled by coupling protrusions and coupling grooves formed on their respective contact surfaces, but they may be moved independently by an external force. Nine springs corresponding to the nine support members are arranged to correspond to the elastic support portion 315'.

Each support member of the elastic support portion 315' comes into close contact with a different portion of the head portion when the rear support part 310 is in close contact with the head portion. Accordingly, the plurality of support members receives different external forces depending on a shape of the head portion in contact. Therefore, the respective support members move individually to deform their corresponding springs.

FIG. 4B is a conceptual view for explaining support members moving independently according to a shape of a head portion.

Referring to FIG. 3B and (a) of FIG. 4B, when the rear support part 310 is brought into close contact with a head portion having a relatively constant curvature, the first to third support members 315a, 315b, and 315c of the elastic support portion move together.

Referring to FIG. 3B, and (b) and (c) of FIG. 4B, when there is a protruding area of a head portion, a support member in contact with the protruding portion moves more than the rest of support members. This may result in minimizing pain on such a relatively protruding portion caused due to pressure by components of the rear support part 310.

Since a plurality of support members and a plurality of springs are relatively moved and deformed according to a shape of a head portion, the head mounted display according to the present invention can be stably worn on various shapes of heads.

The body part 100 of the HMD 1000 worn on the head portion may move linearly toward the front of the both eyes or rotate within a specific range. Hereinafter, components for allowing the body part to move and rotate will be described.

Figure 5A:
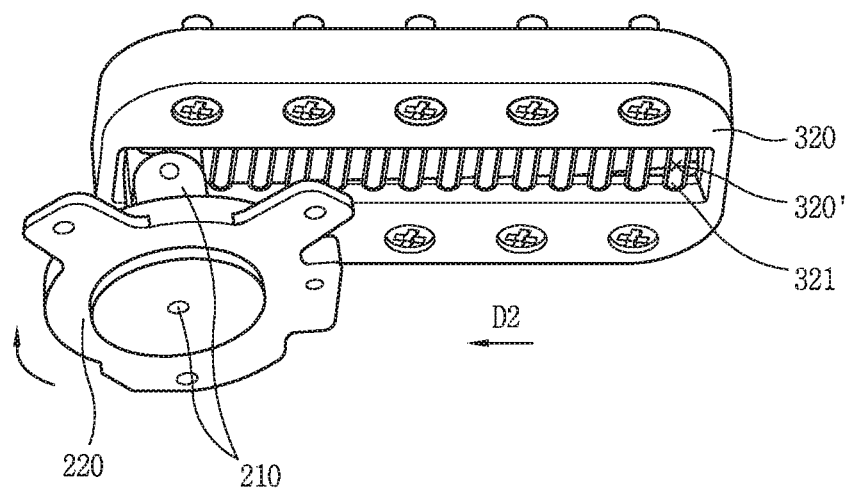
FIGS. 5A and 5B are partially enlarged views illustrating components making a body part movable.
Figure 5B:
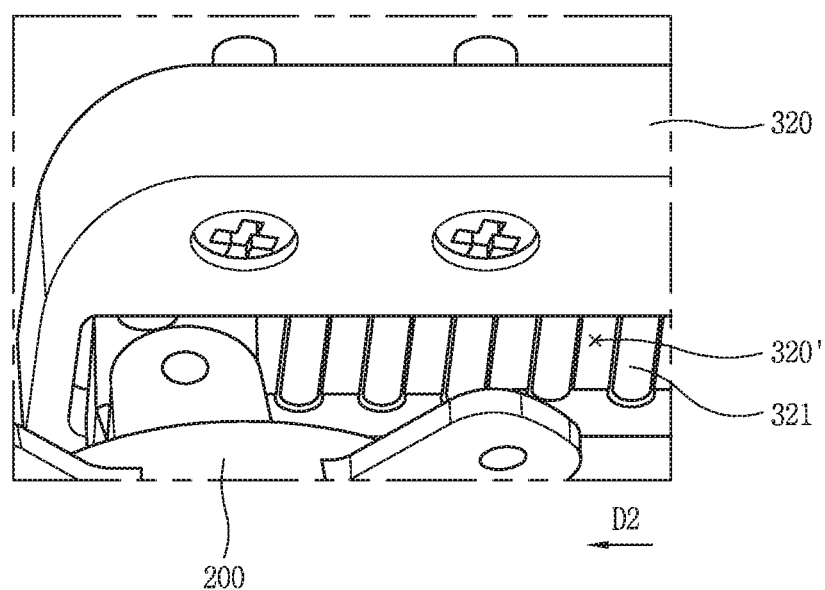

FIGS. 5A and 5B are partially enlarged views illustrating components making the body part movable.

Figure 1C:
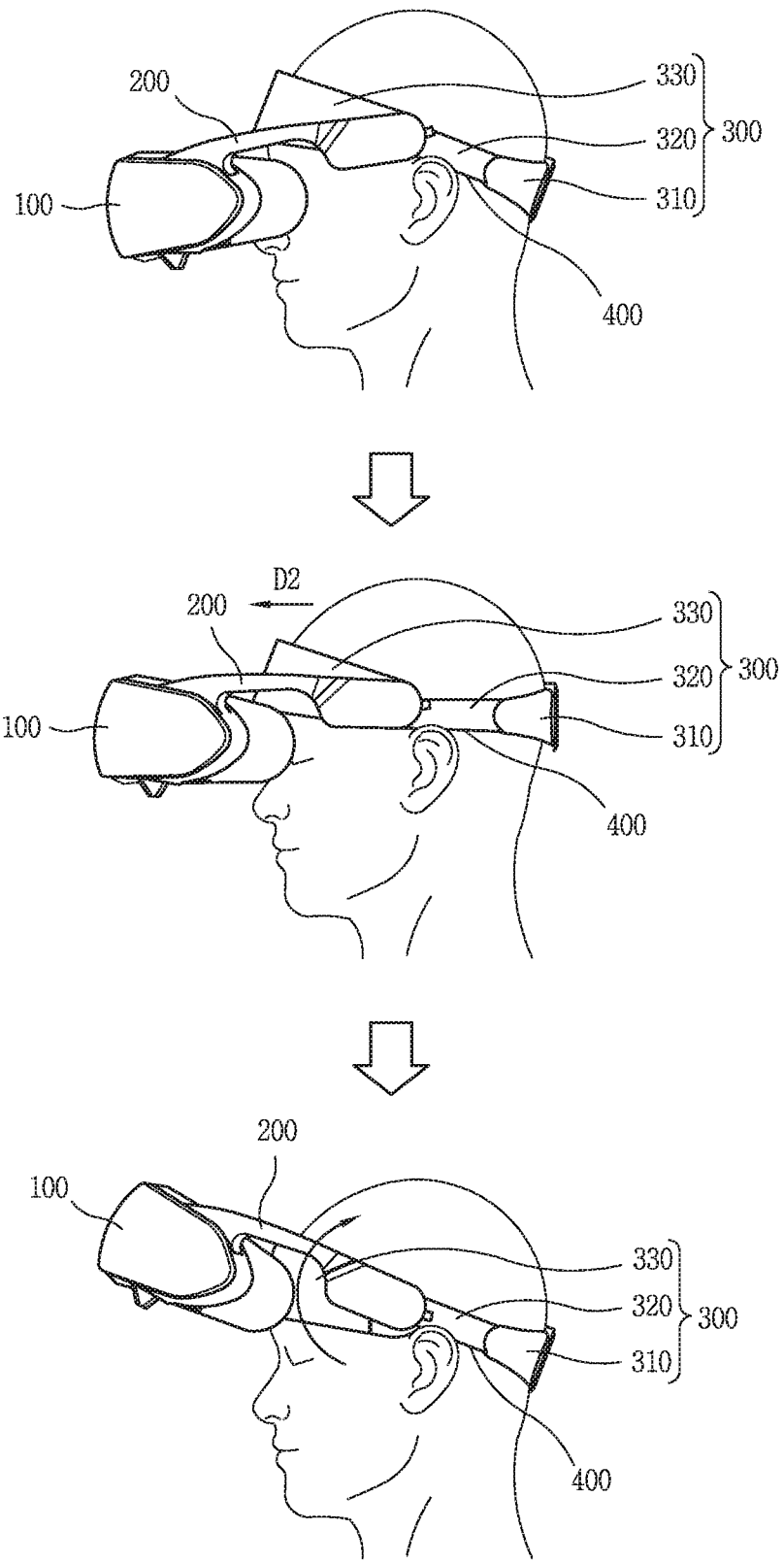
FIG. 1C is a conceptual view for explaining a state of the present invention in which a body part is moved and rotated while being fixed to a head.

Referring to FIGS. 1C, 5A, and 5B, a rail portion 320' is formed by recessing one surface of the connecting part 320 along a second direction D2. The connecting frame 200 includes first and second connection members 210 and 220 fixed to the connecting part 320 so as to be rotatable and movable.

The first and second connection members 210 and 220 are fixed to each other, and the first connection member 210 is mounted on the rail portion 320' of the connecting part 320, and the second connection member 220 is fixed to one portion of the connecting frame 200.

The first connection member 210 is inserted so as to move along the rail portion 320' in the second direction D2. The rail portion 320' includes a plurality of protrusions 321 protruding with preset distances. The preset distance may not be constant. A proper distance between the plurality of protrusions 321 may be determined according to an appropriate distance between the display module included in the body part 100 and the both eyes, and an appropriate distance needed for the body part 100 to be placed on the head portion when the display module is not used.

While the first connection member 210 is moved by an external force, the first connection member 210 moves over the protrusions 321. If an external force is not applied, the first connection member 210 is placed between the protrusions 321, thereby restricting movement. Accordingly, when the user moves the body part 100 in the second direction D2 or an opposite direction, the user can sense movement of the body part 100 in a tactile manner through the protrusions 321 and make the body part 100 located and fixed to a specific area.

Meanwhile, the second connection member 220 is formed on the first connection member 210 to be rotatable with respect to an axis perpendicular to the rail portion 320'. For example, the second connection member 220 may be rotatably connected to the first connection member 210.

The second connection member 220 is formed such that the body part 100 can be rotated in a specific rotation range (for example, 0 to 15 degrees). Accordingly, the user can adjust a position of the display module according to a position of the both eyes and an angle of a gaze.

Figure 6:
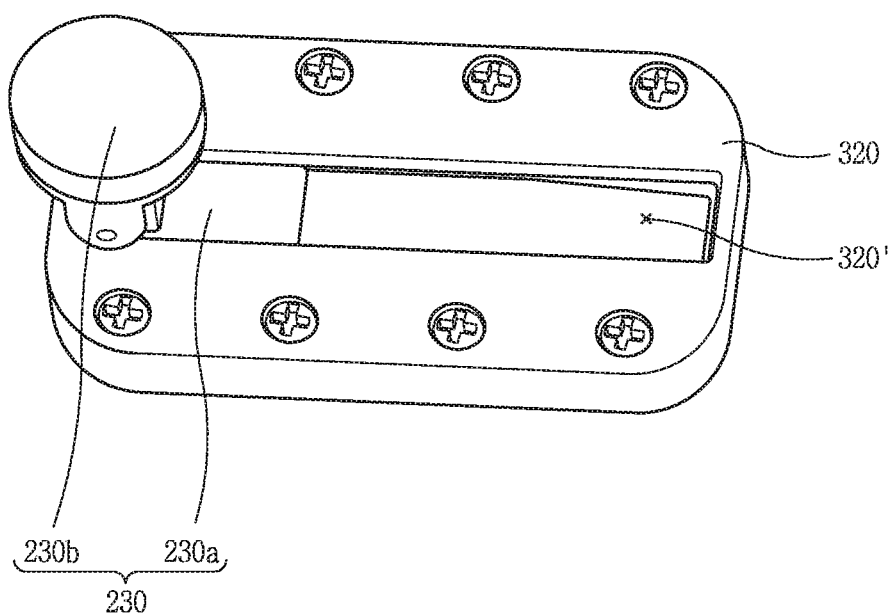
FIG. 6 is a conceptual view illustrating a guide rail in accordance with another embodiment of the present invention.

FIG. 6 is a conceptual view illustrating a guide rail in accordance with another embodiment of the present invention.

Referring to FIG. 6, the first connection member 230 includes first and second areas 230a and 230b that are fixed to each other. The first area 230a may have a plate-like shape to be fitted into the rail portion 320'.

The rail portion 320' includes a recessed portion so that the first area 230a of the plate-like shape can move along the second direction D2. The rail portion 320' according to this embodiment of the present invention is not provided with a protrusion.

Meanwhile, the second area 230b is fixed to the first area 230a, and protrudes from the connecting part 320 so as to be connected to the second connection member (not shown) fixed to the connecting frame 200.

Figure 7A:
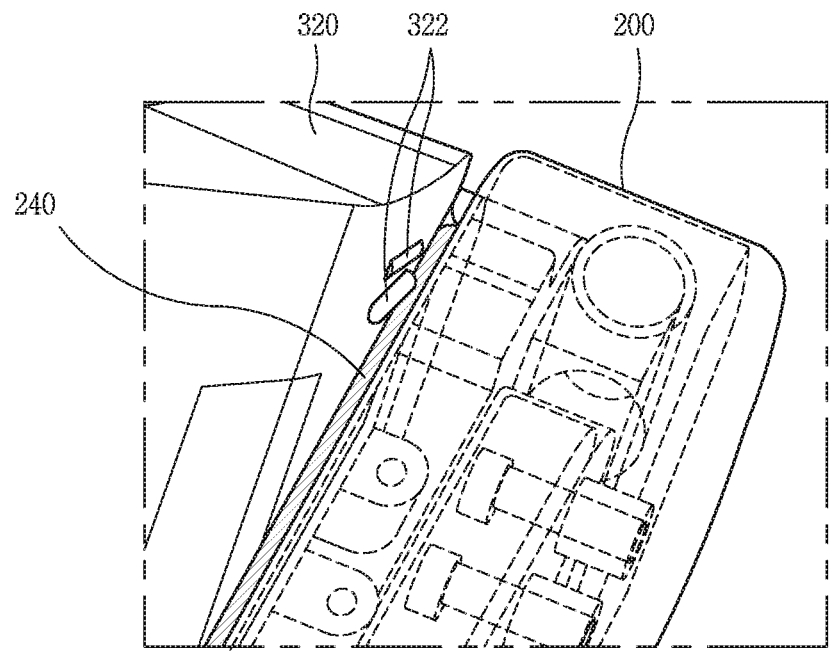
FIGS. 7A and 7B are conceptual views illustrating an angle adjustment protrusion.
Figure 7B:
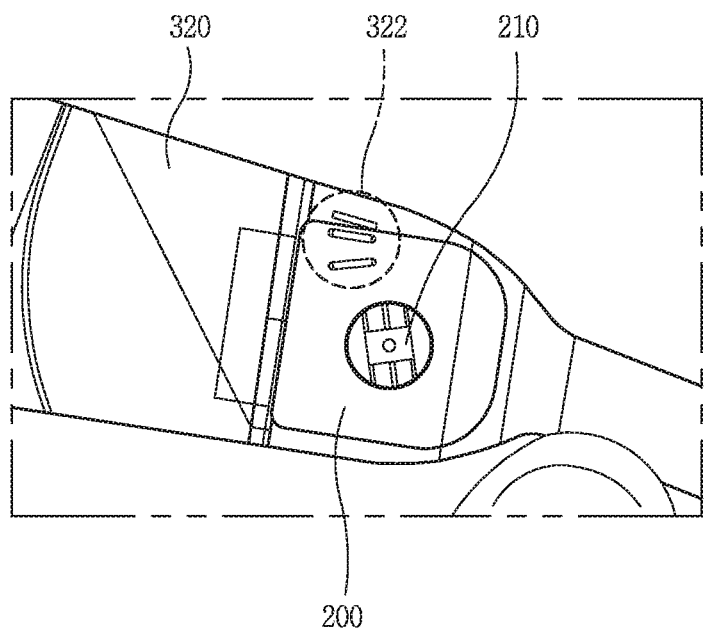

FIGS. 7A and 7B are conceptual views illustrating an angle adjustment protrusion.

When the connecting part 320 is connected by the first and second connection members 210 and 220 (See FIG. 5), the connecting part 320 includes a plurality of angle adjustment protrusions 322 protruding from a surface thereof facing the connecting frame 200. The plurality of angle adjustment protrusions 322 have a specific length and are spaced apart from each other. The plurality of angle adjustment protrusions 322 are arranged in different directions from each other. That is, the plurality of angle adjustment projections 322 may be arranged to form specific angles.

Meanwhile, the connecting frame 200 includes a support protrusion 240 formed to be engaged (or stopped) between the angle adjustment protrusions 322. The support protrusion 240 is formed on one surface of the connecting frame 200 facing the connecting part 320. The support protrusion 240 gets stopped by one of the angle adjustment protrusions 322. Rotation of the body part 100 and the connecting frame 200 allows the support protrusion 240 to move over the angle adjustment protrusions 322 and to be locked by one of the angle adjustment protrusions 322, thereby supporting the body part 100 to maintain a specific angle.

The angle adjustment protrusions 322 are positioned at a specific angle and a specific area depending on a relative position to the body part 100, in a used state where the display module is positioned at the front of the both eyes of the user, a non-used state where the body part 100 is fixed to the head portion, and an unmounted state where the head-mounted display is removed from the head portion.

The body part 100 is stably fixed as the support protrusion 240 is stopped by the angle adjustment protrusions 322 according to each state. Therefore, it is possible to prevent the body part 100 from rotating in an undesired direction during use.

Figure 8A:
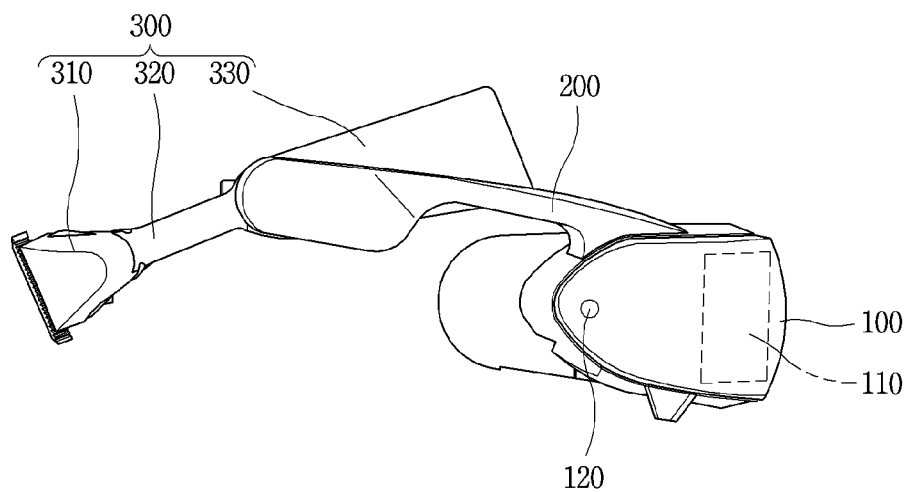
FIGS. 8A and 8B are conceptual views illustrating an angle adjustment dial for a lens.
Figure 8B:
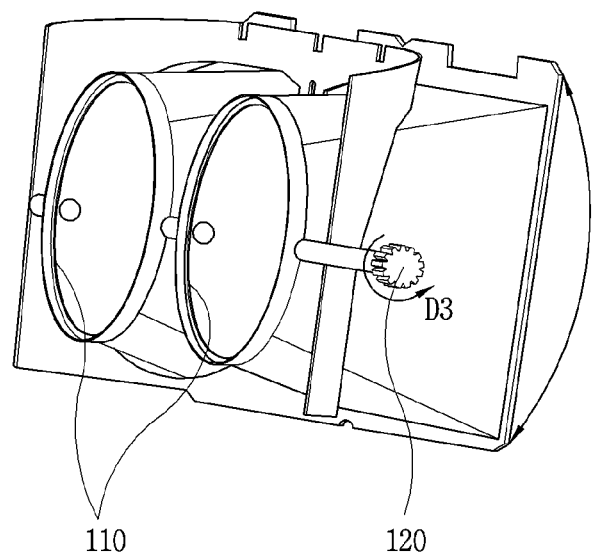

FIGS. 8A and 8B are conceptual views illustrating an angle adjustment dial for lens.

Referring to FIGS. 8A and 8B, a pair of lenses 110 corresponding to both eyes are disposed inside the body part 100, and the lenses 110 are arranged at a specific angle to display an image.

Meanwhile, the angle adjustment dial is mounted on the pair of lenses 110. The angle adjustment dial 120 extends along a third direction D3. The pair of lenses 110 are arranged in the third direction D3.

One end portion of the angle adjustment dial 120 may protrude from the body part 100. The protruded one end portion of the angle adjustment dial 120 may be rotated within a specific angle range with respect to an axis of the third direction D3. An angle of the pair of lenses 110 fixed to the angle adjustment dial 120 is changed by rotation of the angle adjustment dial 120. Accordingly, the user can change the angle of the lenses 110 to an angle suitable for seeing an image according to a position of the both eyes, a rotation angle of the body part, and a distance between the body part and the both eyes.

The detailed description should not be limitedly construed in all of the aspects, and should be understood to be illustrative. All changes and modifications that fall within the metes and bounds of the claims, or equivalents of such metes and bounds are therefore intended to be embraced by the appended claims.

INDUSTRIAL AVAILABILITY

The present invention provides a head-mounted display (HMD) that is worn to be suitable for a shape of a head portion and allows a display module to be changed in position in the worn state. Therefore, the present invention can be utilized in various related industrial fields.

The invention claimed is:

1. A head-mounted display (HMD), comprising:
   a body part including a display part for displaying an image;
   a fixing part, which surrounds a head part to allow the body part to be fixed to the head part and includes a front support part, a rear support part, and a connecting part;
   a connecting frame that connects the body part to the fixing part to allow the body part to rotate and move with reference to the fixing part; and
   a band part, which has opposite ends fixed to the fixing part and is formed to elastically surround the head part, together with the front support part,
   wherein the rear support part comprises:
      a cover portion;
      a support portion placed on the cover portion and having first to third support members which are individually moved by an external force; and
      a spring portion that includes first to third springs arranged to respectively correspond to the first to third support members and configured to elastically deform in an individual manner, and
   wherein the first to third support members are disposed adjacent to one another and are coupled to be individually movable by coupling protrusions and coupling grooves formed on surfaces facing each other.

2. The head-mounted device of claim 1, further comprising:
   a guide portion disposed on the cover portion and supporting the spring portion,
   wherein the guide portion includes a plurality of guide protrusions extending in one direction, the first to third springs are disposed between the plurality of guide protrusions, and movement of at least one of the first to third support members allows both end portions of at least one spring, corresponding to the moved at least one support member, of the first to third support members to be deformed while moving along the one direction.

3. The head-mounted device of claim 1, further comprising a tightening module mounted on the cover portion so that the connecting part is inserted into and pulled out of the rear support part to adjust a size of a space formed by the fixing part.

4. The head-mounted device of claim 3, further comprising a cushion portion that is deformed by the head part when the space is reduced in size by the tightening module, and is mounted on the cover portion to support the head part,
   wherein at least one of the first to third support members of the support portion is moved by the deformation of the cushion portion.

5. The head-mounted device of claim 1, wherein the connecting part includes a rail portion connected to a first connection member of the connecting frame and extending in one direction so that the connecting frame is movable in the one direction.

6. The head-mounted device of claim 5, further comprising a plurality of protrusions arranged on the rail portion along the one direction.

7. The head-mounted device of claim 5, wherein the first connection member includes a first area formed in a plate shape so as to be mounted on the rail portion in a movable manner, and a second area protruding from the first area and connected to the body part.

8. The head-mounted device of claim 5, wherein the connecting frame includes a second connection member connected to the first connection member and coupled to the connecting part so as to be rotatable with respect to a direction perpendicular to the rail portion.

9. The head-mounted device of claim 8, wherein the connecting part is provided with a plurality of angle adjustment protrusions arranged at different angles on one surface thereof, facing the connecting frame, and
   wherein the connecting frame is provided with a support protrusion extending in a specific direction from one surface thereof, facing the connecting part, so as to be engaged between the plurality of angle adjustment protrusions while the connecting frame is rotated with respect to the axis.

10. The head-mounted device of claim 1, wherein the support portion includes a portion that is elastic to provide support.

* * * * *